US 8,965,654 B2

(12) United States Patent
Yamanaka et al.

(10) Patent No.: US 8,965,654 B2
(45) Date of Patent: Feb. 24, 2015

(54) VEHICLE CONTROL DEVICE

(75) Inventors: Satoshi Yamanaka, Susono (JP); Yoshio Ito, Susono (JP); Takahiro Yokokawa, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/235,566

(22) PCT Filed: Feb. 3, 2012

(86) PCT No.: PCT/JP2012/052552
§ 371 (c)(1),
(2), (4) Date: Jan. 28, 2014

(87) PCT Pub. No.: WO2013/114623
PCT Pub. Date: Aug. 8, 2013

(65) Prior Publication Data
US 2014/0172257 A1    Jun. 19, 2014

(51) Int. Cl.
G06F 17/00    (2006.01)
F16D 48/02    (2006.01)
F16D 48/06    (2006.01)

(52) U.S. Cl.
CPC .............. *F16D 48/02* (2013.01); *F16D 48/066* (2013.01); *F16D 2500/3024* (2013.01); *F16D 2500/5085* (2013.01)
USPC ........................................................... 701/68

(58) Field of Classification Search
None
See application file for complete search history.

(56) References Cited

U.S. PATENT DOCUMENTS

| 5,719,768 | A  | * | 2/1998  | Tashiro et al. ................... 701/67 |
| 7,597,650 | B2 |   | 10/2009 | Rzepecki, II et al.                      |
| 8,062,174 | B2 | * | 11/2011 | Sah et al. ......................... 477/15 |
| 8,092,343 | B2 | * | 1/2012  | Leibbrandt et al. ............ 477/174 |

FOREIGN PATENT DOCUMENTS

JP    2006-138426 A    6/2006

* cited by examiner

*Primary Examiner* — Dirk Wright
(74) *Attorney, Agent, or Firm* — Kenyon & Kenyon LLP

(57) ABSTRACT

A vehicle control device includes an engine and a clutch configured to connect and disconnect a power transmission path between the engine and a drive wheel according to a supplied hydraulic pressure. The vehicle control device is configured to carry out neutral control that controls the hydraulic pressure supplied to the clutch to an N control study value for placing the clutch in a semi-engaged state while a vehicle stops and inertia control (free-run control, deceleration eco-run control, and N inertia control) that carries out an inertia travelling by releasing the clutch while the vehicle travels. At the time that the inertia control is executed, the vehicle control device controls the hydraulic pressure supplied to the clutch to the same value as the N control study value.

2 Claims, 8 Drawing Sheets

VEHICLE CONTROL DEVICE

CROSS-REFERENCE TO RELATED APPLICATIONS

This is a national phase application based on the PCT International Patent Application No. PCT/JP2012/052552filed on Feb. 3, 2012, the entire contents of which are incorporated herein by reference.

FIELD

The present invention relates to a vehicle control device.

BACKGROUND

Conventionally, there has been known a configuration for interrupting the power transmission between an engine and a drive wheel while a vehicle travels by releasing a clutch disposed on a power transmission path from the engine according to the operating state of the vehicle (for example, Patent Literature 1).

CITATION LIST

Patent Literature

Patent Literature 1: U.S. Pat. No. 7,597,650

SUMMARY

Technical Problem

When a clutch is released while a vehicle travels, if the clutch is perfectly released, there is a possibility that responsiveness and shock are degraded at the time the clutch is reengaged. Further, when a control hydraulic pressure of the clutch is made excessively high while the clutch is released, there is a possibility that drag increases and efficiency is deteriorated. As described above, there has been a room for improvement in the hydraulic control of a clutch when the clutch is released while a vehicle travels.

An object of the present invention, which was made in view of the circumstances, is to provide a vehicle control device capable of preferably carrying out the hydraulic control of a clutch when the clutch is released while a vehicle travels.

Solution to Problem

In order to achieve the above mentioned object, a vehicle control device according to the present invention includes: an engine; and a clutch configured to connect and disconnect a power transmission path between the engine and a drive wheel according to a supplied hydraulic pressure, wherein the vehicle control device is capable of carrying out: neutral control that controls the hydraulic pressure supplied to the clutch to a neutral control pressure for placing the clutch in a semi-engaged state while a vehicle stops; and inertia control that carries out an inertia travelling by releasing the clutch while the vehicle travels, and at the time that the inertia control is executed, the vehicle control device controls the hydraulic pressure supplied to the clutch to the same hydraulic pressure as the neutral control pressure.

Further, in the vehicle control device, it is preferable that the inertia control is control that carries out the inertia travelling by releasing the clutch and stopping the engine while the vehicle travels, and at the time of return from the inertia control, the hydraulic pressure supplied to the clutch is controlled to the hydraulic pressure obtained by adding an increasing amount to the neutral control pressure during the period from the restart of the engine to a complete explosion of the engine and the clutch is engaged after the complete explosion of the engine.

Advantageous Effects of Invention

In the vehicle control device according to the present invention, when inertia control is carried out, since the hydraulic pressure supplied to the clutch is controlled to the same pressure as neutral control pressure, the excessive reduction of the supplied hydraulic pressure can be avoided and the responsiveness of clutch control can be improved. Further, since the excessive increase of the supplied hydraulic pressure can be also avoided, a drag loss can be reduced. As a result, the vehicle control device according to the present invention achieves an effect that the hydraulic pressure control of the clutch can be preferably carried out when the clutch is released while the vehicle travels.

DESCRIPTION OF EMBODIMENTS

Figure 1:
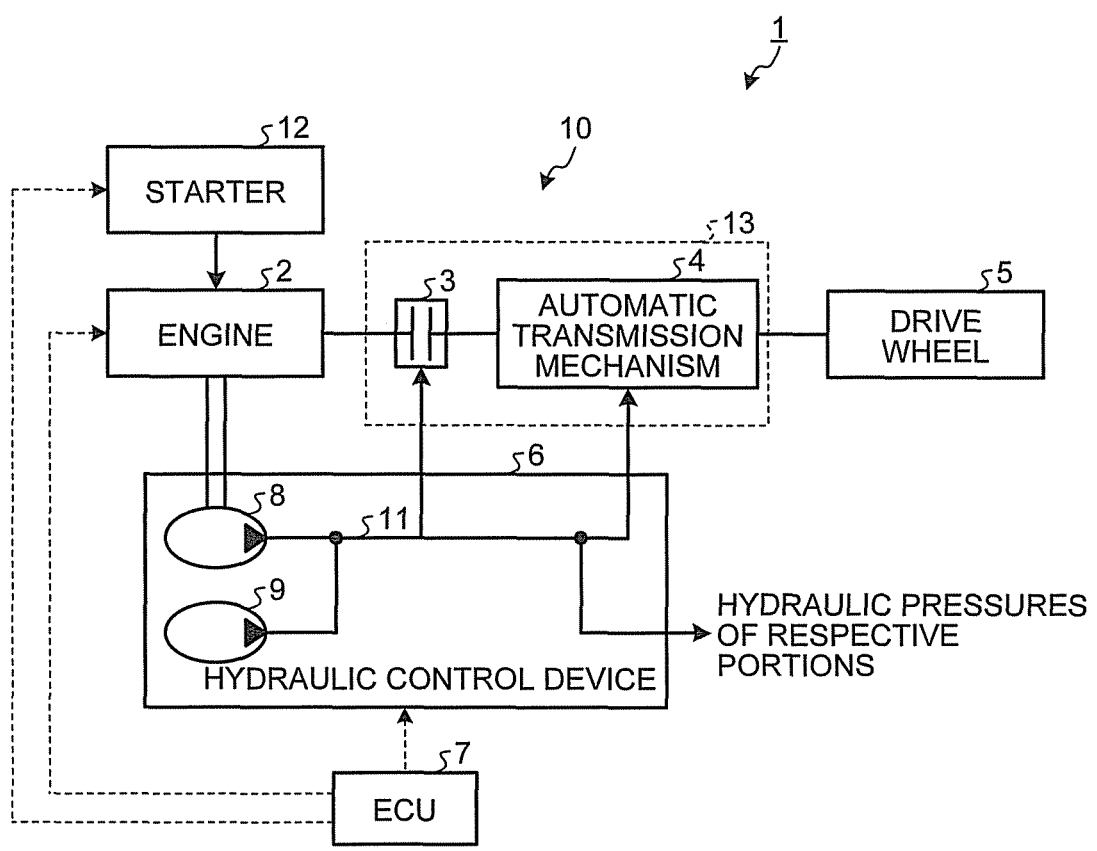
FIG. 1 is a view illustrating a schematic configuration of a vehicle control device according to an embodiment of the present invention.

An embodiment of a vehicle control device according to the present invention will be explained below based on the drawings. In the drawings, the same or corresponding portions are denoted by the same reference numerals and the explanation thereof is not repeated.

[First Embodiment]

A first embodiment of the present invention will be explained referring to FIG. 1 to FIG. 5. First, a configuration of a vehicle control device 10 according to a first embodiment will be explained with referring to FIG. 1. FIG. 1 is a view illustrating a schematic configuration of the vehicle control device according to the embodiment of the present invention.

As illustrated in FIG. 1, the vehicle control device 10 is mounted on a vehicle 1. The vehicle 1 includes an engine 2, a transmission 13, and a drive wheel 5. The engine 2 is an internal combustion engine as the traveling drive source of the vehicle 1 and the driving force thereof is controlled according to a fuel injection amount. The transmission 13 transmits the driving force generated by the engine 2 to the drive wheel 5 side. The drive wheel 5 is rotated by the driving force of the engine 2 transmitted via the transmission 13 and can cause the vehicle 1 to travel forward or backward.

The transmission 13 is configured to include a clutch 3 and an automatic transmission mechanism 4. The engine output torque (motive energy) of the engine 2 is input from an engine output shaft to the automatic transmission mechanism 4 via a torque converter (not illustrated) and the clutch 3 and transmitted from the automatic transmission mechanism 4 to the drive wheel 5 via a not illustrated deceleration mechanism, a differential gear, and the like. As described above, a power transmission path is configured between the engine 2 and the drive wheel 5.

The clutch 3 has a function for connecting and disconnecting the power transmission path between the engine 2 and the drive wheel 5. The clutch 3 includes an engine side engaging element coupled with the engine 2 side and a drive wheel side engaging element coupled with the drive wheel 5 side. The engagement of the engine side engaging element with the drive wheel side engaging element causes the clutch 3 to connect the power transmission path between the engine 2 and the drive wheel 5. In contrast, the disengagement of the engine side engaging element from the drive wheel side engaging element causes the clutch 3 to interrupt the power transmission path between the engine 2 and the drive wheel 5. In other words, the clutch 3 functions as a switching device for switching the state that the power can be transmitted and the state that the power cannot be transmitted in the power transmission path between the engine 2 and the drive wheel 5.

The automatic transmission mechanism 4 is an automatic transmission for automatically changing a gear shift ratio (gear shift stage, gear stage) according to the traveling state of the vehicle 1 and can be applied to various automatic transmissions, for example, a planetary gear type and parallel spur-gear type stepped automatic transmission (AT), a semi-automatic transmission such as a dual clutch transmission (DCT), a multi-mode manual transmission (MMT), a sequential manual transmission (SMT), and a belt type or toroidal type continuously variable transmission (CVT), and the like.

A hydraulic control device 6 has a function for supplying a hydraulic pressure to the clutch 3 and the automatic transmission mechanism 4. The hydraulic control device 6 adjusts the hydraulic pressure supplied to the automatic transmission mechanism 4 in response to a gear shift ratio change command input from an ECU 7 so that it can control the gear shift ratio of the automatic transmission mechanism 4.

Further, the hydraulic control device 6 adjusts the hydraulic pressure supplied to the clutch 3 in response to a clutch control command input from the ECU 7 so that it can control the release and engagement of the clutch 3. The hydraulic control device 6 can switch the released state and the engaged state of the clutch 3 and further can also control the degree of engagement of the clutch 3.

The hydraulic control device 6 includes a mechanical pump 8 (a first hydraulic pressure source) and an electrically driven pump 9 (a second hydraulic pressure source) as two hydraulic pressure sources. The mechanical pump 8 is coupled with the engine 2 and can be driven in association with the engine 2. The mechanical pump 8 can inject oil using the driving force of the engine 2 and create a hydraulic pressure.

The electrically driven pump 9 can be driven by a not illustrated motor. The motor operates in response to a control command from the ECU 7. Specifically, the electrically driven pump 9 can create the hydraulic pressure by injecting the oil under the control of the ECU 7 without depending on the operating state of the engine 2.

The mechanical pump 8 and the electrically driven pump 9 are connected to a hydraulic circuit 11. The hydraulic pressure created by the mechanical pump 8 and the electrically driven pump 9 is supplied to the clutch 3, the automatic transmission mechanism 4, and respective portions in the vehicle 1 via the hydraulic circuit 11. The hydraulic circuit 11 is disposed with not illustrated pressure regulating valves, and the hydraulic pressures supplied to the respective portions can be controlled by controlling the pressure regulating valves in response to a control command from the ECU 7.

The vehicle 1 is provided with the ECU 7 (Electronic Control Unit) for controlling the engine 2, the clutch 3, the automatic transmission mechanism 4, and the hydraulic control device 6. The ECU 7 has a function for comprehensively controlling the engine 2, the clutch 3, and the automatic transmission mechanism 4 (the hydraulic control device 6). The vehicle control device 10 of the embodiment includes the engine 2, the clutch 3, the hydraulic control device 6 and the ECU 7.

The ECU 7 controls the respective portions of the vehicle 1 based on the information of various sensors in the vehicle 1. The ECU 7 determines a fuel injection amount, an injection timing, and an ignition timing based on the operating state of the engine 2 such as a engine revolution speed, an intake air amount, and a throttle opening degree and controls an injector and an ignition plug. Further, the ECU 7 has a gear shift map, determines the gear shift ratio of the automatic transmission mechanism 4 based on the throttle opening degree and the vehicle speed and controls the hydraulic control device 6 to establish the determined gear shift ratio.

The ECU 7 can execute inertia control for causing the vehicle 1 to carry out inertia traveling by interrupting the power transmission path between the engine 2 and the drive wheel 5 by releasing the clutch 3 while the vehicle 1 travels while being decelerated. The inertia control is executed when, for example, an accelerator is totally closed by setting an accelerator opening degree to 0 and when the accelerator opening degree is set equal to or less than a predetermined opening degree. The inertia control in the embodiment includes at least one of free-run control, deceleration eco-run control, and N inertia control.

The deceleration eco-run control is control for causing the vehicle 1 to travel while stopping the engine 2 by releasing the clutch 3. In the deceleration eco-run control, fuel economy can be improved because the engine 2 consumes no fuel. The deceleration eco-run control executes an idling stop by stopping the operation of the engine 2 when the vehicle 1 travels in the deceleration mode mainly due to the brake operation of a driver.

The free-run control is control for causing the vehicle 1 to travel while stopping the engine 2 by releasing the clutch 3 likewise the deceleration eco-run control. The free-run control executes the idling stop by positively stopping the operation of the engine 2 not only when the vehicle 1 travels while being decelerated or stops due to the brake operation of the driver but also when the vehicle 1 travels at a constant speed.

The N inertia control causes the vehicle 1 to travel by releasing the clutch 3 while operating the engine 2 in an idle state. The N inertia control corresponds to control for causing the vehicle 1 to travel by shifting the automatic transmission mechanism 4 to a neutral position. In the N inertia control, since an engine brake does not operate, the fuel economy can be improved by reducing a travel load. Further, since the engine 2 is kept in rotation, the N inertia control is excellent in acceleration responsiveness at the time of return from the N inertia control.

The inertia control may be executed when the vehicle 1 can travel at the constant speed in the state that the clutch 3 is engaged in addition to the time of deceleration. In other words, the inertia control may be executed when the vehicle 1 is not accelerated. The inertia control of the embodiment can execute inertia travelling at the accelerator opening degree at which the engine 2 is in a driven state in which the engine 2 is driven by the drive wheel 5 and at the accelerator opening degree at which the engine 2 is not placed in a driving state in which the engine 2 drives the drive wheel 5.

When the accelerator is depressed while the vehicle 1 carries out the inertia travelling by the inertia control, the ECU 7 engages the clutch 3 and returns the vehicle 1 from the inertia travelling state. As a result, acceleration can be executed by the power of the engine 2.

Further, while the vehicle 1 stops, the ECU 7 can execute neutral control for releasing the clutch 3. The execution of the neutral control corresponds to a neutral state (an N-range) because the clutch 3 is released while operating the engine 2 in the idle state. In the neutral control, the fuel economy at the time of idling can be improved by reducing an engine load by establishing the neutral state.

More specifically, the ECU 7 is configured such that, during the neutral control, the ECU 7 controls the clutch 3 to a semi-engaged state in the range where no power is transmitted without perfectly disengage it so that the responsiveness of the clutch 3 can be improved at the time of return from the neutral control. The ECU 7 can calculate the hydraulic pressure necessary to be supplied to the clutch 3 to achieve the semi-engaged state by a study process. In the study process, the hydraulic pressure supplied to the clutch 3 is controlled so that, for example, the difference of rotation of the clutch 3 on the power transmission path between an upper stream and a lower stream is set to a target value (the difference of rotation capable of placing the clutch 3 in a desired semi-engaged state). In the embodiment, the value of the hydraulic pressure supplied to the clutch 3, which is calculated as a result of the study process, is described as an N control study value (a neutral control value).

In particular, in the embodiment, when the clutch 3 is released while the inertia control is executed, the ECU 7 can control the hydraulic pressure supplied to the clutch 3 so that the pressure becomes the same value as the N control study value (a neutral control pressure) calculated in the neutral control.

The engine 2 is connected with a starter 12. The starter 12 is a driving source such as a motor that is operated in response to a control command from the ECU 7 and starts the engine 2.

Next, the operation of the vehicle control device 10 according to the embodiment will be explained referring to FIG. 2 to FIG. 4.

When the inertia control is executed, the vehicle control device 10 of the embodiment carries out a hydraulic pressure control process to control the hydraulic pressure supplied to the clutch 3 (hereinafter, described also as "a clutch hydraulic pressure") to the N control study value (the neutral control pressure). However, in the inertia control, the contents of the process are partly different in the case of the free-run control and the deceleration eco-run control and in the case of the N inertia control. In other words, the contents of the hydraulic pressure control process are partly different depending on whether or not the engine stops while the inertia control is executed.

First, the hydraulic pressure control process carried out when the free-run control or the deceleration eco-run control is executed will be explained referring to FIGS. 2 and 3. FIG. 2 is a time chart illustrating the hydraulic pressure control process carried out when the free-run control or the deceleration eco-run control is executed by the vehicle control device 10 of the embodiment, and FIG. 3 is a flowchart of the hydraulic pressure control process.

The operation of the vehicle control device 10 when the inertia control starts to be carried out will be explained referring to FIG. 2. The time chart of FIG. 2 illustrates the time transitions of a vehicle speed, a clutch hydraulic pressure, numbers of revolutions (an engine revolution speed and numbers of clutch revolutions in front of and behind the clutch), the hydraulic pressure generated by the mechanical pump 8, and the hydraulic pressure generated by the electrically driven pump 9, respectively.

Figure 2:
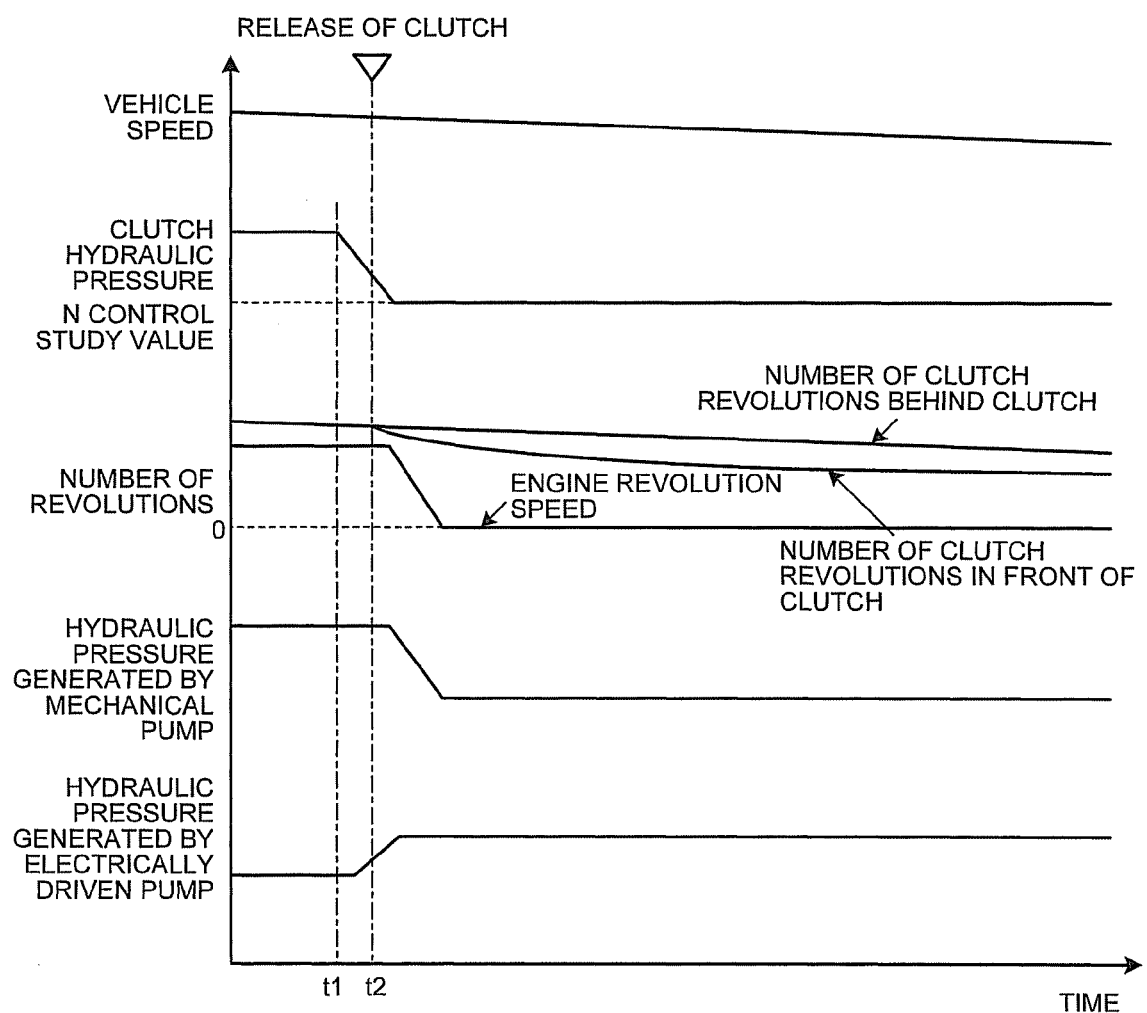
FIG. 2 is a time chart illustrating a hydraulic pressure control process carried out when free-run control or deceleration eco-run control is executed in a first embodiment.

The time chart of FIG. 2 illustrates the state that the inertia control (the free-run control or the deceleration eco-run control) is executed during vehicle deceleration and the vehicle speed is uniformly decelerated. At the beginning of the time chart, since the clutch 3 is engaged, the number of clutch revolution in front of the clutch and the number of clutch revolution behind the clutch that are the numbers of clutch revolutions on the upstream and downstream sides of the clutch 3 are the same number of revolutions.

At a time t1, the condition for carrying out the inertia travelling (the free-run control or the deceleration eco-run control) is established and the releasing control of the clutch 3 starts. After t1, the clutch hydraulic pressure reduces at a predetermined reducing gradient.

While the releasing control of the clutch 3 is executed after the time t1, the electrically driven pump 9 starts to be driven and the hydraulic pressure generated by the electrically driven pump 9 starts to increase. When the hydraulic pressure generated by the electrically driven pump 9 reaches a predetermined hydraulic pressure, the pressure is kept constant.

At a time t2, when the clutch 3 has been released, a difference of rotation starts to be generated between the numbers of clutch revolutions in front of and behind the clutch. After the clutch has been released at the time t2, the stop control of the engine 2 is carried out and the engine revolution speed is reduced to 0. Further, the drive of the mechanical pump 8 is stopped by stopping the engine and the hydraulic pressure generated by the mechanical pump 8 is also reduced to 0.

After the clutch 3 has been released, the clutch hydraulic pressure is controlled to the same value as the N control study value and kept to the value while the inertia control (the free-run control or the deceleration eco-run control) is continued.

Next, the hydraulic pressure control process of the clutch 3 will be explained referring to FIG. 3. The process of the flowchart is executed by the ECU 7 at, for example, a predetermined cycle.

First, whether or not the study process of the neutral control has been completed is confirmed (S101). As described above, the study process of the neutral control is a process for studying the clutch hydraulic pressure so that the clutch 3 is placed in the semi-engaged state while the vehicle stops. The completion of the study process is determined under, for example, the condition that the difference of rotation between the numbers of clutch revolutions on the upstream and downstream sides of the clutch 3 is converged to a predetermined target value capable of achieving a desired clutch semi-engaged state. The clutch hydraulic pressure at the time the study process has been completed is kept as the N control study value. When it is determined at step S101 that the study of the neutral control has not been completed, the process is finished.

In contrast, when it is determined at step S101 that the study process of the neutral control has been completed, next, it is confirmed whether or not the permission condition of the inertia control (the free-run control or the deceleration eco-run control) has established (S102). The permission condition of the inertia control (the free-run control or the deceleration eco-run control) is set as to various information such as the vehicle speed, the engine 2, the accelerator, a brake, a shift position, a battery, and a vehicle state. When it is determined at step S102 that the permission condition of the inertia control (the free-run control or the deceleration eco-run control) has established, a process goes to step S103, whereas when the permission condition has not established, the process is finished.

When the conditions at step S101 and S102 have been satisfied, specifically, when the study of the neutral control has been completed, the N control study value has been calculated, and the permission condition of the inertia control (the free-run control or the deceleration eco-run control) has established, the inertia control at step S103 and the steps thereafter can be executed. In the time chart of FIG. 2, the conditions of step S101 and S102 have established at time t1 and the inertia control is started.

In the inertia control, first, the releasing control of the clutch 3 is started (S103), and then the electrically driven pump 9 is started (S104). In the time chart of FIG. 2, at the time t1, the clutch 3 is started to be released and the clutch hydraulic pressure is started to decrease, and thereafter the electrically driven pump 9 is started and the hydraulic pressure generated by the electrically driven pump is increased.

Next, the stop control of the engine 2 is carried out (S105). In the time chart of FIG. 2, the stop control of the engine 2 is executed after the clutch 3 has been released at the time t2, and the engine revolution speed is reduced to 0.

Figure 3:
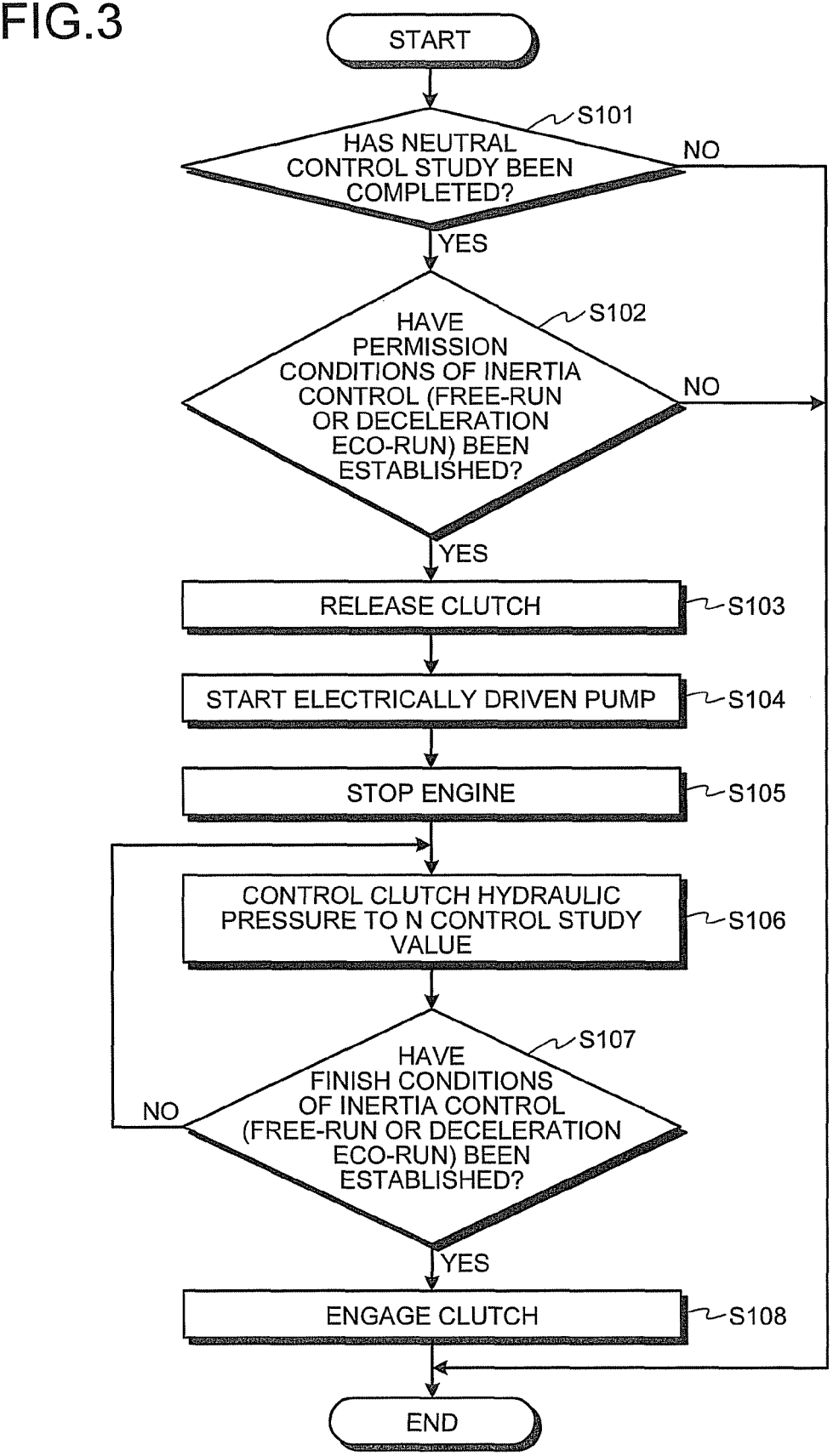
FIG. 3 is a flowchart of the hydraulic pressure control process carried out when the free-run control or the deceleration eco-run control is executed in the first embodiment.

The respective processes for releasing the clutch, starting the electrically driven pump, and stopping the engine at steps S103 to S105 may be carried out in a sequence different from the example illustrated in FIGS. 2 and 3.

The clutch hydraulic pressure that is the hydraulic pressure supplied to the disengaged clutch 3 is controlled to the N control study value calculated by the study process of the neutral control (S106), and then whether or not the finish condition of the inertia control (the free-run control or the deceleration eco-run control) has established is confirmed (S107). As the finish condition of the inertia control (the free-run control or the deceleration eco-run control), for example, the case that an accelerator operation is detected can be set. When the finish condition of the inertia control has not established, the process returns to step S106 and the control for keeping the clutch hydraulic pressure to the N control study value is continued. In the time chart of FIG. 2, after the clutch 3 has been released at time t2 and the clutch hydraulic pressure has reduced to the N control study value, the loop at steps S106 and S107 is repeated, and the clutch hydraulic pressure is kept to the N control study value.

In contrast, when it is determined at step S107 that the finish condition of the inertia control has established, the process returns from the inertia control, the clutch 3 is engaged (S108), and the process is finished.

Next, the hydraulic pressure control process carried out when the N inertia control is executed will be explained referring to FIGS. 4 and 5. FIG. 4 is a time chart illustrating the hydraulic pressure control process carried out when the N inertia control is executed by the vehicle control device 10 of the embodiment, and FIG. 5 is a flowchart of the hydraulic pressure control process.

Figure 4:
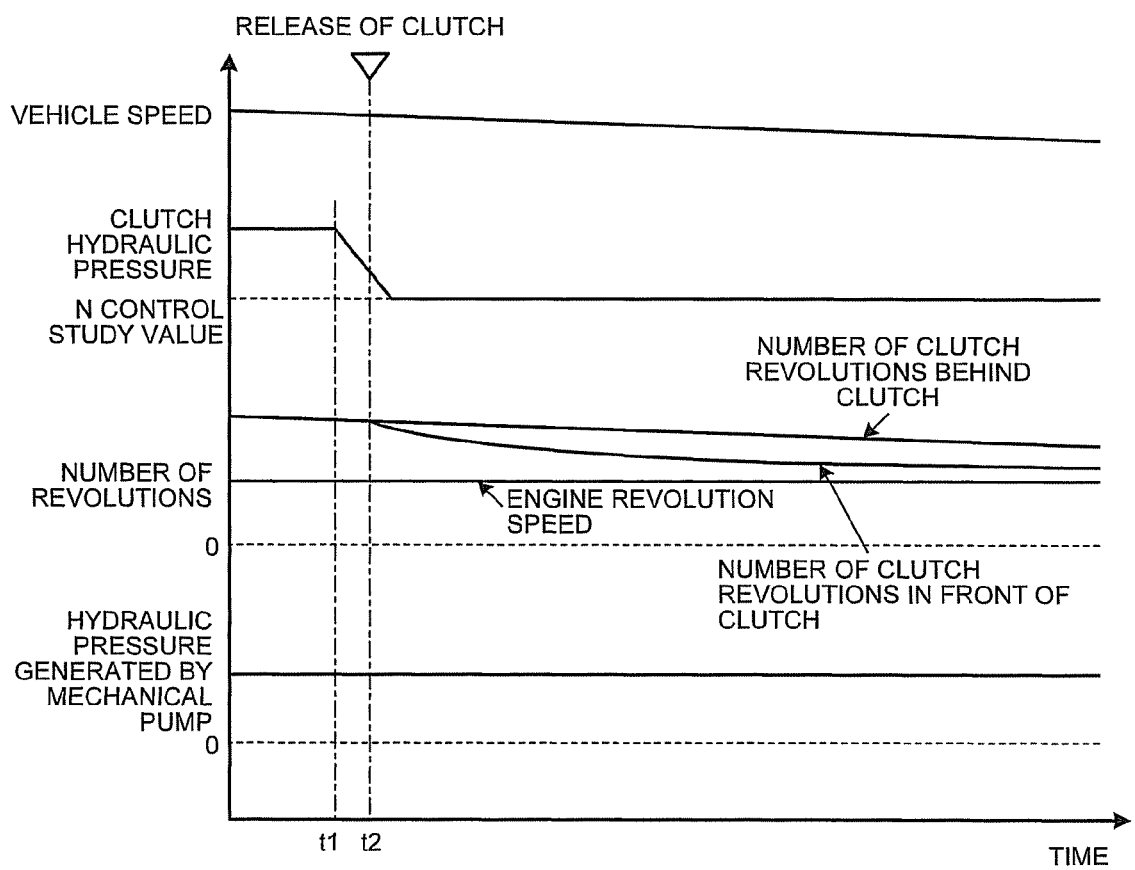
FIG. 4 is a time chart illustrating the hydraulic pressure control process carried out when N inertia control is executed in the first embodiment.
Figure 5:
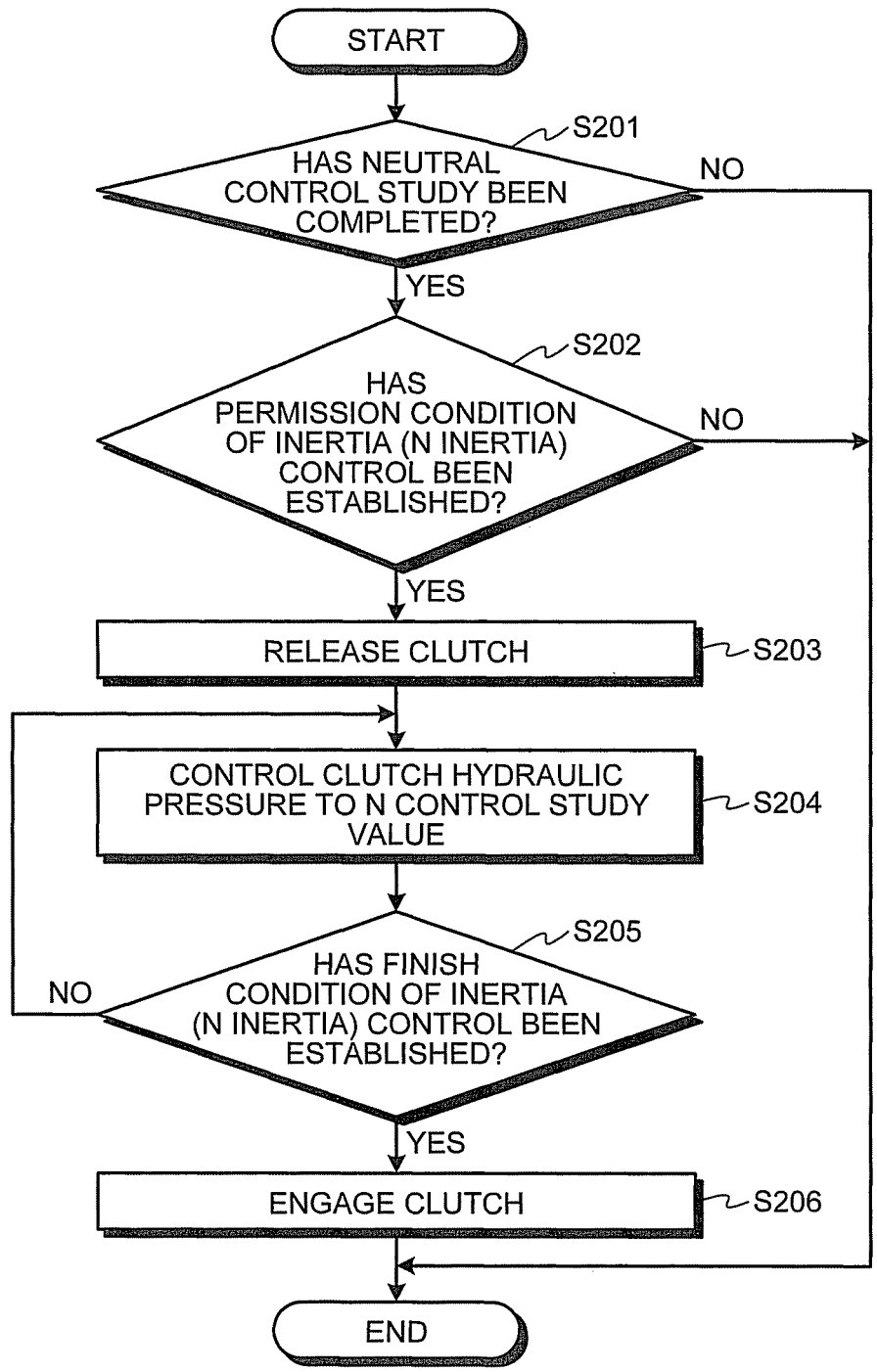
FIG. 5 is a flowchart illustrating the hydraulic pressure control process carried out when the N inertia control is executed in the first embodiment.

Almost all the portions of the time chart of FIG. 4 and the flowchart of FIG. 5 are common to the time chart of FIG. 2 and the flowchart of FIG. 3. The hydraulic pressure control process, which is illustrated in FIGS. 4 and 5 and carried out when the N inertia control is executed by the vehicle control device 10, is different from the hydraulic pressure control process of FIGS. 2 and 3 in that the engine 2 is not stopped while the N inertia control is executed and that the electrically driven pump 9 is not driven when the engine is not stopped.

In the time chart of FIG. 4, the execution condition of the inertia travelling (the N inertia control) is established at a time t1 and the releasing control of the clutch 3 is started. The clutch hydraulic pressure reduces at a predetermined reducing gradient after the t1. When the clutch 3 has been released at a time t2, a difference of rotation starts to be generated between the numbers of clutch revolutions in front of and behind the clutch. After the clutch 3 has been released, the clutch hydraulic pressure is controlled to the same value as the N control study value and the value is kept while the inertia control (the N inertia control) continues.

Steps S201, S203, S204, and S206 of the flowchart of FIG. 5 are the same as steps S101, S103, S106, and S108 of the flowchart of FIG. 3.

Step S202 is different from step S102 for confirming the permission condition of the inertia control (the free-run control or the deceleration eco-run control) in that S202 confirms whether or not the permission condition of the inertia control (the N inertia control) has established. The permission condition of the inertia control (the N inertia control) is also set as to the various information such as the vehicle speed, the engine 2, the accelerator, the brake, the shift position, the battery, and the vehicle state.

Likewise, step S205 is different from step S102 for confirming the finish condition of the inertia control (the free-run control or the deceleration eco-run control) in that step S205 confirms whether or not the finish condition of the inertia control (the N inertia control) has established. As the finish condition of the inertia control (the N inertia control), for example, the case that the accelerator operation is detected can be also set.

Next, the effect of the vehicle control device 10 according to the embodiment will be explained.

The vehicle control device 10 of the embodiment includes the engine 2 and the clutch 3 for connecting and disconnecting the power transmission path between the engine 2 and the drive wheel 5 according to the supplied hydraulic pressure. The vehicle control device 10 can carry out the neutral control, which controls the hydraulic pressure supplied to the clutch 3 to the N control study value for placing the clutch 3 in the semi-engaged state while the vehicle stops and the inertia control (the free-run control, the deceleration eco-run control, and the N inertia control) which carries out the inertia travelling by releasing the clutch 3 while the vehicle travels. When the inertia control is executed, the vehicle control device 10 controls the hydraulic pressure supplied to the clutch 3 to the same value as the N control study value.

With the configuration, when the inertia control is executed, the clutch hydraulic pressure after the clutch 3 has been released is controlled to the N control study value calculated by the neutral control. The N control study value is a clutch hydraulic pressure capable of keeping the clutch 3 in the semi-engaged state in which no power is transmitted when the vehicle stops. Specifically, while the inertia control is executed, the clutch 3 can be kept in the semi-engaged state in which no power is transmitted.

Keeping the clutch hydraulic pressure to the N control study value while the inertia control is executed can avoid the clutch hydraulic pressure from being excessively reduced while the clutch is released. With the operation, when the clutch 3 is reengaged, since the clutch hydraulic pressure can be promptly increased to the hydraulic pressure at which torque can be transmitted, the responsiveness of the clutch control can be improved.

Further, since the increase amount of the clutch hydraulic pressure necessary when the clutch 3 has been reengaged can be suppressed, the shock caused by the change of torque at the time of engagement and the clogging of a drive system due to back-lash can be reduced. Further, since an excessive increase of the clutch hydraulic pressure while the clutch is released increases the drag of an engaged portion, it is deemed that a problem arises in that the allowance for improving the fuel economy reduces. However, since keeping the clutch hydraulic pressure to the N control study value while the inertia control is executed can avoid the clutch hydraulic pressure from being excessively increased while the clutch is released, a drag loss can be reduced while the clutch is released.

Further, when it is intended to set the clutch hydraulic pressure to an optimum value while the clutch is released as described above, it is deemed that a problem arises in that a suitable man-hour increases. In the embodiment, since it becomes unnecessary to suit a new hydraulic pressure to the inertia control by diverting the N control study value calculated in the existing neutral control, the suitable man-hour can be greatly reduced. As a result, an appropriate hydraulic pressure can be simply set because the hydraulic pressure can be easily suited.

As described above, according to the vehicle control device 10 of the embodiment, the hydraulic pressure control of the clutch 3 can be preferably carried out when the clutch has been released while the vehicle travels.

[Modification of First Embodiment]

Figure 6:
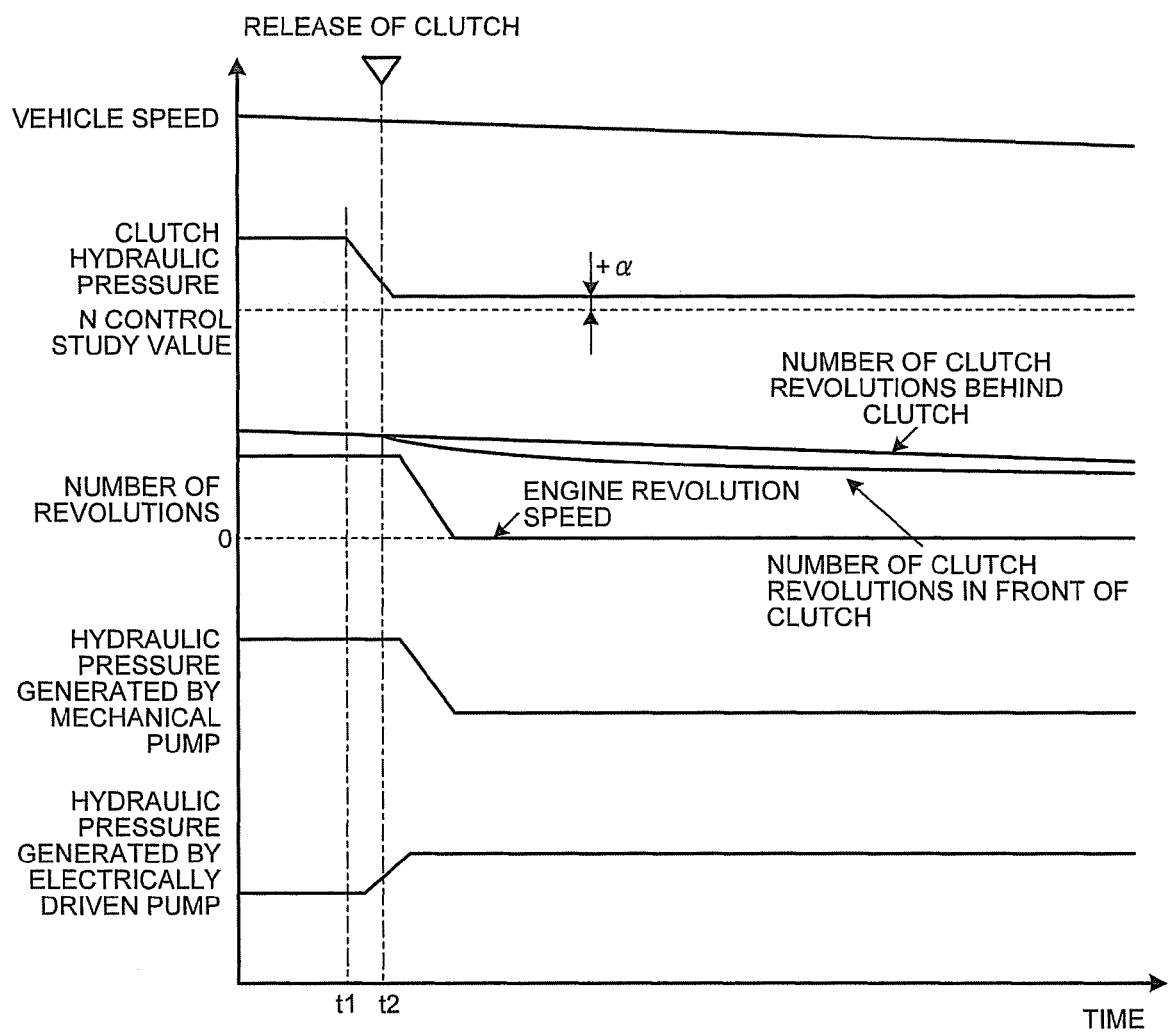
FIG. 6 is a time chart illustrating a modification of the first embodiment.

A modification of the embodiment will be explained referring to FIG. 6. FIG. 6 is a time chart illustrating the hydraulic pressure control process carried out when the free-run control or the deceleration eco-run control is executed by a vehicle control device 10 according to the modification of the embodiment.

In the configuration of the first embodiment, the clutch hydraulic pressure is controlled to the N control study value after the clutch 3 has been released during the inertia control. However, the clutch hydraulic pressure after the clutch has been released may be set to a value obtained by adding an increasing amount α to the N control study value. In the case, as illustrated in FIG. 6, the clutch hydraulic pressure is kept to "an N control study value+α" after the clutch 3 has been released.

In the neutral control, although it is premised that the vehicle 1 stops, the inertia control includes also the case that the vehicle 1 travels. As to the responsiveness of the vehicle 1, required responsiveness is different between the response from the vehicle when it stops and the response from the vehicle when it travels. Specifically, the response from the vehicle when it travels requires a more prompt response. For this reason, in the modification illustrated in FIG. 6, since the clutch hydraulic pressure while the clutch 3 is released is set to a large value of "the N control study value+α", the control responsiveness of the clutch 3 can be more improved when the clutch 3 is reengaged at the time of return from the inertia control.

Although the time chart of FIG. 6 exemplifies the hydraulic pressure control process carried out when the free-run control and the deceleration eco-run control are executed, the modification can be applied also to the hydraulic pressure control process carried out when the N inertia control is executed.

[Second Embodiment]

Figure 7:
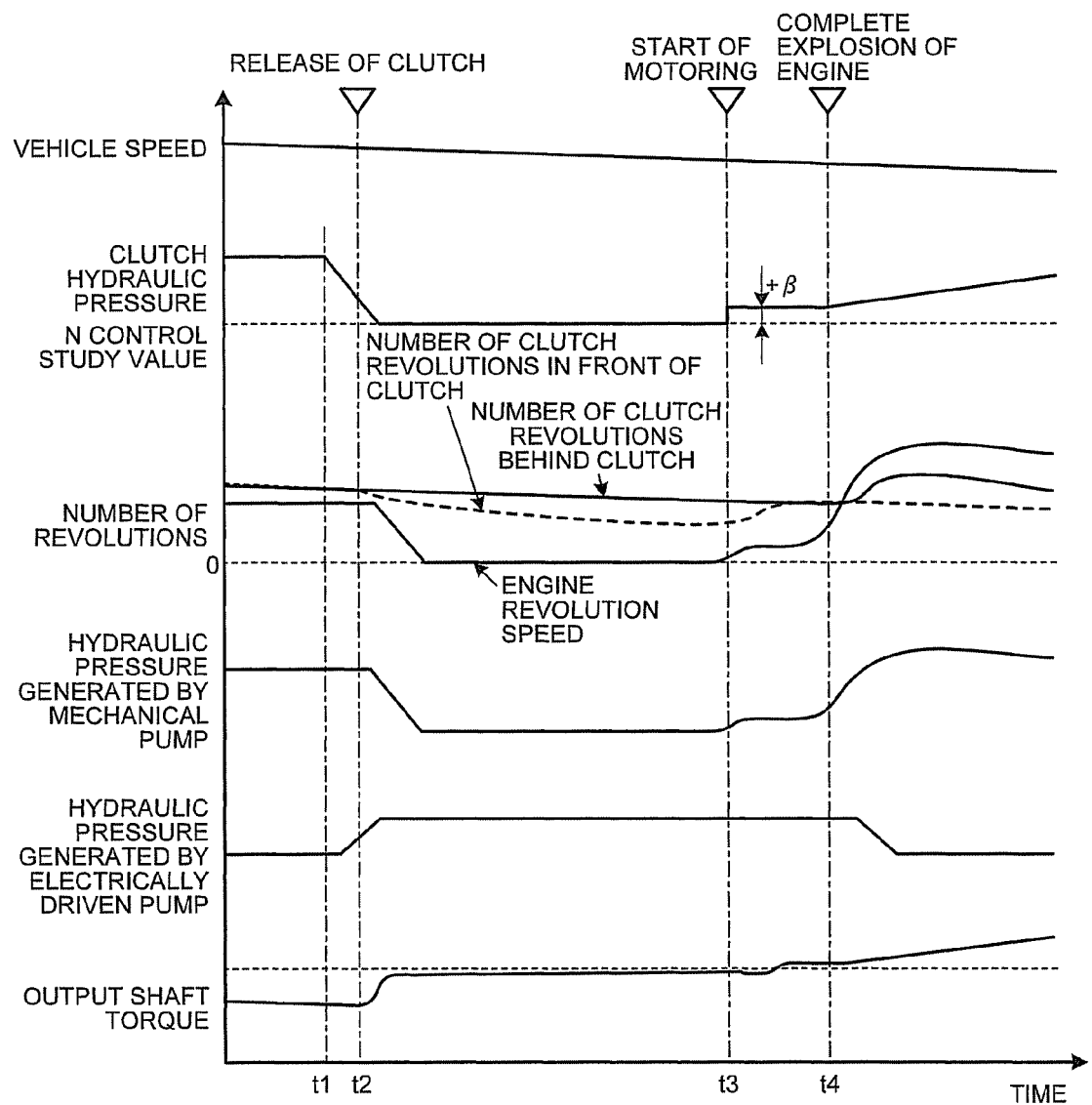
FIG. 7 is a time chart illustrating a hydraulic pressure control process carried out when free-run control or deceleration eco-run control is executed in a second embodiment.

A second embodiment of the present invention will be explained referring to FIGS. 7 and 8. FIG. 7 is a time chart illustrating a hydraulic pressure control process carried out when inertia control (free-run control or deceleration eco-run control) is executed by a vehicle control device 10 of the second embodiment of the present invention, and FIG. 8 is a flowchart of the hydraulic pressure control process.

Figure 8:
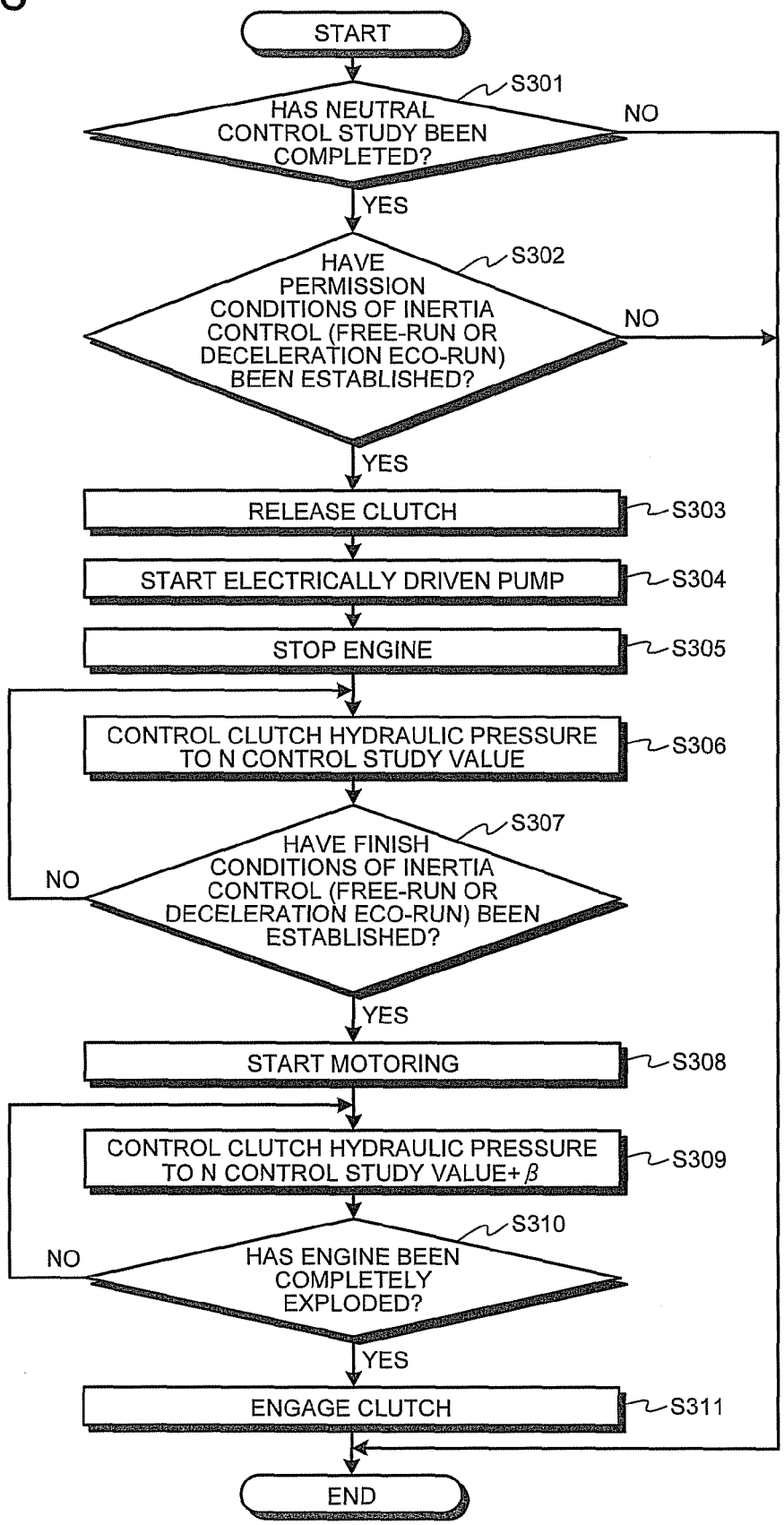
FIG. 8 is a flowchart of the hydraulic pressure control process carried out when the free-run control or the deceleration eco-run control is executed in the second embodiment.

As illustrated in FIGS. 7 and 8, the second embodiment is different from the first embodiment in that, at the time of return from inertia control (the free-run control or the deceleration eco-run control), the hydraulic pressure supplied to a clutch 3 is controlled to the hydraulic pressure obtained by adding an increasing amount β to neutral control pressure during the period from the restart of an engine 2 to the complete explosion thereof. In the inertia control, the second embodiment can be applied to the free-run control or to the deceleration eco-run control that is configured to stop the engine while the control is carried out and cannot be applied to N inertia control.

Steps S301 to S307 in the flowchart of FIG. 8 are the same as step S101 to S107 of the flowchart of FIG. 3.

When it is determined at step S307 that the finish condition of the inertia control (the free-run control or the deceleration eco-run control) has established, motoring is started by a starter 12 to return from the inertia control (S308). In the time chart of FIG. 7, the finish condition of the inertia control is established at a time t3 and the motoring is started by the starter 12 for the return from the inertia control. With the operation, the output shaft of the engine 2 is driven by the starter 12 and an engine revolution speed starts to be generated.

Next, a clutch hydraulic pressure that is the hydraulic pressure supplied to the clutch 3 that is released is controlled to the value obtained by adding the increasing amount β to an N control study value (S309). In the time chart of FIG. 7, the clutch hydraulic pressure is changed from the N control study value to the N control study value+β in response to the start of the motoring at the time t3. The increasing amount β can be appropriately set according to the individual configurations of the clutch 3 and is, for example, 10 kPa. Further, the increasing amount β can be set larger than the increasing amount α of the clutch hydraulic pressure used while the clutch is released in the modification of the first embodiment.

Next, whether or not the engine 2 has completely exploded is confirmed (S310). When it is determined that the engine 2 has not completely exploded, a process returns to step S309 and control for keeping the clutch hydraulic pressure to the N control study value+β is continued. In the time chart of FIG. 7, the loop at steps S309 and S310 is repeated until the engine 2 has completely exploded at a time t4, and the clutch hydraulic pressure is kept to the N control study value+β.

In contrast, when it is determined at step S310 that the engine 2 has completely exploded, the process returns from the inertia control, the clutch 3 is engaged (S311), and the process is finished. In the time chart of FIG. 7, when the engine 2 has completely exploded at the time t4, the clutch hydraulic pressure is increased and the clutch 3 is engaged.

With the configuration, when the motoring is started by the starter 12, since the clutch hydraulic pressure is increased from the N control study value to the N control study value+β during the period from the restart of the engine 2 to the complete explosion thereof, the degree of engagement of the clutch 3 can be previously advanced before the return from the inertia control. Thus, a part of the torque generated by the starter 12 for the motoring can be transmitted also to the downstream side of the clutch 3 so that the backlash of a drive system can be eliminated by reducing the difference between the number of revolutions of the clutch 3 on the upstream side and the number of revolutions thereof on the downstream side before the clutch 3 is recoupled. As a result, drivability can be improved because the shock at the time of reengagement can be eased.

Although the present invention has been explained showing the preferable embodiments, the present invention is by no means limited by the embodiments. The present invention may be configured by combining the embodiments explained above, and the respective components of the embodiments may be changed to the components that can be easily replaced by a person skilled in the art and are easy or can be changed to substantially the same components.

For example, in the embodiment, although the mechanical pump 8 and the electrically driven pump 9 are exemplified as the two hydraulic pressure sources of the hydraulic control device 6, they may be appropriately replaced with other hydraulic pressure sources. The mechanical pump 8 is shown as an example of the first hydraulic pressure source capable of generating the hydraulic pressure using the driving force of the engine 2 and can be replaced with a hydraulic pressure source for generating a hydraulic pressure using the driving force of the engine likewise the mechanical pump 8. Further, the electrically driven pump 9 is shown as an example of the second hydraulic pressure source capable of generating a hydraulic pressure without depending on the operating state of the engine 2 and can be replaced with other hydraulic pressure source such as an accumulator.

REFERENCE SIGNS LIST

1 vehicle
2 engine
3 clutch
6 hydraulic control device
7 ECU
10 vehicle control device

The invention claimed is:

1. A vehicle control device comprising:
an engine; and
a clutch configured to connect and disconnect a power transmission path between the engine and a drive wheel according to a supplied hydraulic pressure, wherein
the vehicle control device is configured to carry out:
neutral control that controls the hydraulic pressure supplied to the clutch to a neutral control pressure for placing the clutch in a semi-engaged state while a vehicle stops; and
inertia control that carries out an inertia travelling by releasing the clutch while the vehicle travels, and
at the time that the inertia control is executed, the vehicle control device controls the hydraulic pressure supplied to the clutch to the same hydraulic pressure as the neutral control pressure.

2. The vehicle control device according to claim 1, wherein
the inertia control is control that carries out the inertia travelling by releasing the clutch and stopping the engine while the vehicle travels, and
at the time of return from the inertia control, the hydraulic pressure supplied to the clutch is controlled to the hydraulic pressure obtained by adding an increasing amount to the neutral control pressure during the period from the restart of the engine to a complete explosion of the engine and the clutch is engaged after the complete explosion of the engine.

* * * * *